(12) United States Patent
Korhonen et al.

(10) Patent No.: US 11,190,324 B2
(45) Date of Patent: Nov. 30, 2021

(54) MULTIPLEXING UPLINK CONTROL CHANNEL SIGNALLING

(71) Applicant: Nokia Technologies Oy, Espoo (FI)

(72) Inventors: Juha S. Korhonen, Espoo (FI); Timo E. Lunttila, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/480,371

(22) PCT Filed: Jan. 31, 2018

(86) PCT No.: PCT/IB2018/050580
§ 371 (c)(1),
(2) Date: Jul. 24, 2019

(87) PCT Pub. No.: WO2018/142287
PCT Pub. Date: Aug. 9, 2018

(65) Prior Publication Data
US 2020/0007298 A1 Jan. 2, 2020

Related U.S. Application Data

(60) Provisional application No. 62/452,431, filed on Jan. 31, 2017.

(51) Int. Cl.
H04L 5/00 (2006.01)
H04W 72/12 (2009.01)

(52) U.S. Cl.
CPC .......... H04L 5/0055 (2013.01); H04L 5/0007 (2013.01); H04W 72/1284 (2013.01)

(58) Field of Classification Search
CPC ..................................................... H04L 5/0055
See application file for complete search history.

(56) References Cited

U.S. PATENT DOCUMENTS

2018/0302916 A1* 10/2018 Lee .................. H04L 1/0029
2019/0223204 A1* 7/2019 Kim .................. H04B 1/00

FOREIGN PATENT DOCUMENTS

WO 2017/168039 A1 10/2017
WO 2017/171615 A1 10/2017
WO 2018/069569 A1 4/2018

OTHER PUBLICATIONS

"New SI proposal: Study on Latency reduction techniques for LTE", 3GPP TSG RAN Meeting #67, RP-150465, Agenda : 13.1.2, Ericsson, Mar. 9-12, 2015, 7 pages.

(Continued)

Primary Examiner — Hoon J Chung
(74) Attorney, Agent, or Firm — Harrington & Smith

(57) ABSTRACT

It is determined that a first feedback for a first downlink data transmission is to be sent (or received) in a subframe n. If it is further determined that a second feedback for a second downlink data transmission is to be sent (or received) in a first slot of the subframe n, the first feedback is transmitted (or received) within a predetermined short transmission time interval within the first slot. As an addition, if it is further determined there is no second downlink data for which corresponding feedback is to be sent (or received) in the first slot of the subframe n, the first feedback is transmitted (or received) in at least the first slot.

20 Claims, 6 Drawing Sheets

(56) References Cited

OTHER PUBLICATIONS

"Revised Work Item on shortened TTI and processing time for LTE", 3GPP TSG RAN Meeting #74, RP-162014, Agenda : 10.11.1, Ericsson, Dec. 5-8, 2016, 8 pages.
"3rd Generation Partnership Project;Technical Specification Group Radio Access Network; Evolved Universal Terrestrial Radio Access (E-UTRA); Study on latency reduction techniques for LTE (Release 14)", 3GPP TR 36.881, V14.0.0, Jun. 2016, 249 pages.
"Simultaneous Transmissions of UL Signals for Shortened TTI Operation", 3GPP TSG RAN WG1 Meeting #87, R1-1612152, Agenda : 6.2.10.2.1, Nokia, Nov. 14-18, 2016, 6 pages.
International Search Report and Written Opinion received for corresponding Patent Cooperation Treaty Application No. PCT/IB2018/050580, dated May 9, 2018, 14 pages.
"Mini-Slot for Latency Reduction", 3GPP TSG RAN WG1 AH_NR Meeting, R1-1700628, Agenda : 5.1.4, NTT Docomo, Iinc., Jan. 16-20, 2017, pp. 1-7.
"On collisions between sTTI and TTI transmissions in UL", 3GPP TSG RAN WG1 Meeting #90, R1-1712936, Agenda : 5.2.1.2.1.3, Nokia, Aug. 21-25, 2017, 7 pages.
"Avoiding Simultaneous UL sTTI and TTI Transmissions in One Carrier", 3GPP TSG RAN WG1 Meeting #88, R1-1701999, Agenda : 7.2.5.2.1.4, Nokia, Feb. 13-17, 2017, 5 pages.
Extended European Search Report received for corresponding European Patent Application No. 18747272,5, dated Nov. 27, 2020, 10 pages.
"Handling collision between PUCCH and sPUCCH", 3GPP TSG RAN WG1 Meeting #87, R1-1611164, Agenda Item: 6.2.10.2.3, Huawei, Nov. 14-18, 2016, 4 pages.

\* cited by examiner

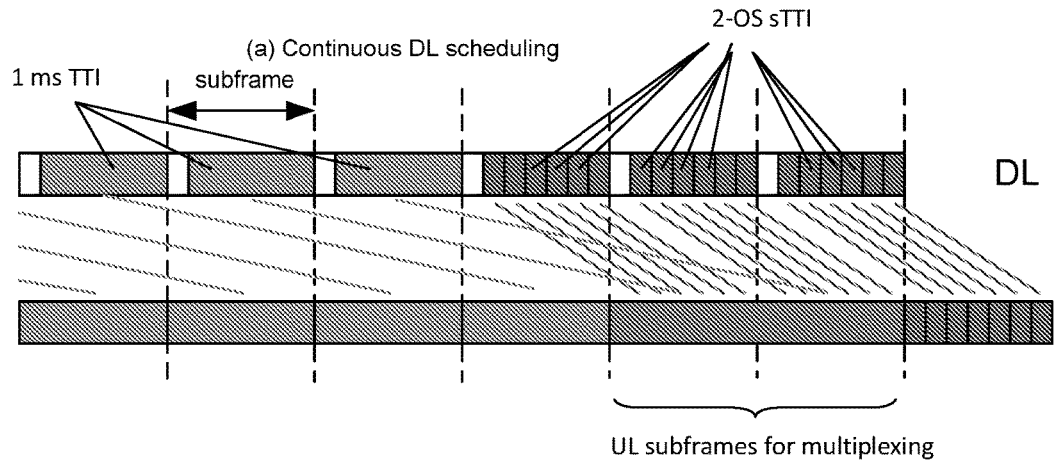
FIG. 1
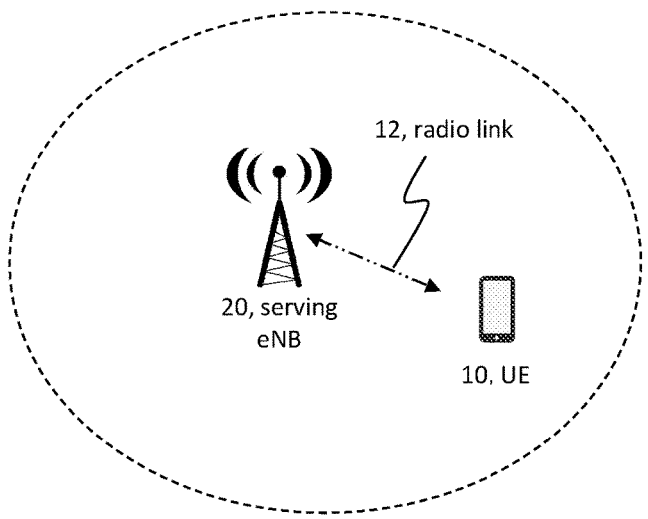
FIG. 2: Prior Art
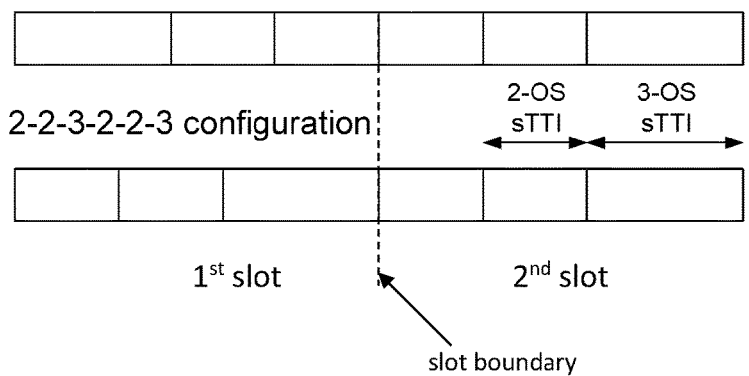
FIG. 3: Prior Art

MULTIPLEXING UPLINK CONTROL CHANNEL SIGNALLING

RELATED APPLICATION

This application was originally filed as Patent Cooperation Treaty Application No. PCT/IB2018/050580 filed Jan. 31, 2018 which claims priority benefit to U.S. Provisional Patent Application No. 62/452,431, filed Jan. 31, 2017.

TECHNICAL FIELD

The described invention relates to wireless communications, and more particularly to multiplexing information such as HARQ-ACK signalling on an uplink control channel despite a changing TTI length on the downlink channel.

BACKGROUND

Acronyms used herein are listed below following the detailed description. Embodiments of these teachings are effective to address latency reduction for the LTE-Advanced Pro system that will be part of 3GPP LTE Rel-15; see document RP-150465 by Ericsson and Huawei entitled *New SI proposal Study on Latency reduction techniques for LTE* [3GPP TSG RAN Meeting #67; Shanghai, China; 9-12 Mar. 2015] and document RP-162014 by Ericsson entitle *Revised Work item on shortened TTI and processing time for LTE* [3GPP TSG RAN Meeting #74; Vienna, Austria; 5-8 Dec. 2016] for which conclusions of that study item are adopted in 3GPP TR 36.881 V14.0.0 (2016.06). In summary, for LTE Rel. 15 processing time and shortening of the transmission duration (TTI length reduction) are necessary in order to improve the physical layer radio latency.

There are a few reasons that necessitate UE sending uplink (UL) control information in one subframe of a carrier for both 2-symbol and 1 ms (14 symbol) downlink (DL) transmissions: The current agreement in 3GPP is that some UEs could have the capability to receive in one subframe of a carrier both a short Physical Downlink Shared Channel (sPDSCH) and also PDSCH unicast transmissions. Simultaneous operation with two transmission time interval (TTI) lengths would enable using the sTTI for latency critical data while the conventional 1 ms TTI would be used for latency tolerant data. Segregating DL traffic this way could lead to the eNB transmitting both PDSCH and sPDSCH(s) for a UE in every subframe, and this means also the corresponding HARQ-ACK PDSCH and sPDSCH feedback transmission would be in every subframe.

For flexible and efficient operation with shorter sTTIs, it is assumed that dynamic per-subframe level switching between sTTI and 1-ms TTI needs to be used. Considering DL-SCH transmission and related HARQ-ACK, a PDSCH transmitted with 1-ms TTI in subframe n can be acknowledged using the conventional HARQ mapping in the UL in subframe n+3 or n+4 (3 or 4 ms later, where n+3 corresponds to a processing time shortened from the legacy value.) On the other hand, HARQ-ACK for a sPDSCH transmitted with 2-symbol (OFDM symbol, or OS) DL sTTI m shall presumably be acknowledged in e.g. sTTI m+4 or m+6, such that the delay between the sPDSCH and the associated HARQ-ACK transmission on the sPUCCH is of the order of 1 ms or less. Whether the timing of the acknowledgement is m+4, m+6, or some other value, is still under discussion in 3GPP. Therefore, it is possible that a sPDSCH and PDSCH scheduled in different subframes need to be acknowledged in the same UL subframe. FIG. 1 illustrates this scenario in which HARQ feedback is sent on the UL carrier when PDSCH TTI changes from the longer 1 ms TTI to the shorter 2-symbol TTI. The diagonal lines from the DL carrier to the UL carrier show the timing relation between data reception on the DL carrier and HARQ-ACK transmission on the UL carrier, and the curly bracket identifies two UL subframes where HARQ-ACK feedback needs to be transmitted both for 2-symbol sTTI and 1-ms TTI.

A carrier aggregation configuration where one of the carriers applies 1-ms TTI and another uses 2-symbol sTTI could become a rather typical one in LTE Rel-15. Since UL HARQ-ACK feedback is carried usually on a single UL carrier, there needs to be a way of multiplexing HARQ-ACK for 2-symbol sTTI and a 1-ms TTI in the same subframe, similar to the two subframes of the UL carrier that are identified by the bracket in FIG. 1. Embodiments of these teachings can be deployed for such multiplexing.

The following may provide relevant background to the teachings herein:

U.S. provisional patent application 62/406,137 entitled "Uplink Control Information Multiplexing" by Timo Lunttila et al., filed on Oct. 10, 2016; subsequently filed as application number PCT/FI2017/050615, filed on Sep. 4, 2017.

U.S. provisional patent application 62/316,285 entitled "Feedback Timing" by Timo Lunttila, et al., filed Mar. 31, 2016; subsequently filed as application number PCT/FI2017/050050, filed on Jan. 30, 2017, publication number WO2017/168039, published on Oct. 5, 2017.

Document R1-1612152 by Nokia, Alcatel-Lucent and Shanghai Bell entitled *Simultaneous Transmissions of UL Signals for Shortened TTI Operation* [3GPP TSG RAN WG1 Meeting #87; Reno, US; 14-18 Nov. 2016].

BRIEF SUMMARY

This section is intended to include examples and is not intended to be limiting.

An example of a method comprises determining that a first feedback for a first downlink data transmission is to be sent in a subframe n. The method also comprises if it is further determined that a second feedback for a second downlink data transmission is to be sent in a first slot of the subframe n, transmitting the first feedback within a predetermined short transmission time interval within the first slot. The method may also comprise if it is further determined there is no second downlink data for which corresponding feedback is to be sent in the first slot of the subframe n, transmitting the first feedback in at least the first slot.

An additional example includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: determine that a first feedback for a first downlink data transmission is to be sent in a subframe n; and if it is further determined that a second feedback for a second downlink data transmission is to be sent in a first slot of the subframe n, transmit the first feedback within a predetermined short transmission time interval within the first slot.

A further example is an apparatus, comprising: processing means for determining that a first feedback for a first downlink data transmission is to be sent in a subframe n; and radio means for transmitting the first feedback within a predetermined short transmission time interval within the first slot if the processing means further determines that a second feedback for a second downlink data transmission is to be sent in a first slot of the subframe n. The radio means may further be for transmitting the first feedback in at least the first slot if the processing means otherwise determines there is no second downlink data for which corresponding feedback is to be sent in the first slot of the subframe n.

Another example is a computer readable memory tangibly storing computer program instructions that, when executed by one or more processors of a host device, causes the host device to perform: determining that a first feedback for a first downlink data transmission is to be sent in a subframe n; and if it is further determined that a second feedback for a second downlink data transmission is to be sent in a first slot of the subframe n, transmitting the first feedback within a predetermined short transmission time interval within the first slot.

In a further example, a method is disclosed that includes determining that a first feedback for a first downlink data transmission is to be received in a subframe n. The method includes, if it is further determined that a second feedback for a second downlink data transmission is to be received in a first slot of the subframe n, receiving the first feedback within a predetermined short transmission time interval within the first slot. The method may additionally include, if it is further determined there is no second downlink data for which corresponding feedback is to be received in the first slot of the subframe n, receiving the first feedback in at least the first slot.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: determine that a first feedback for a first downlink data transmission is to be received in a subframe n; and if it is further determined that a second feedback for a second downlink data transmission is to be received in a first slot of the subframe n, receive the first feedback within a predetermined short transmission time interval within the first slot.

A further example is an apparatus comprising: means for determining that a first feedback for a first downlink data transmission is to be received in a subframe n; and means, responsive to it being further determined that a second feedback for a second downlink data transmission is to be received in a first slot of the subframe n, for receiving the first feedback within a predetermined short transmission time interval within the first slot.

A computer readable memory tangibly storing computer program instructions that, when executed by one or more processors of a host device, causes the host device to perform: determining that a first feedback for a first downlink data transmission is to be received in a subframe n; and if it is further determined that a second feedback for a second downlink data transmission is to be received in a first slot of the subframe n, receiving the first feedback within a predetermined short transmission time interval within the first slot.

BRIEF DESCRIPTION OF THE DRAWINGS

In the attached Drawing Figures:

FIG. 1 is a conceptual view of a DL carrier on which a UE receives PDSCHs and sPDSCHs of differing TTI lengths, and conventional mapping/timing relation of their HARQ ACK feedback on an UL carrier indicated by the diagonal lines that show the need for multiplexing the different TTI-length HARQ ACKs in the UL subframes identified by the bracket.

FIG. 2 is a prior art schematic diagram illustrating an example radio environment in which embodiments of these teachings may be practiced.

FIG. 3 is a conceptual view of two different candidates for the sPUCCH subframe structure consisting of a mix of 2-symbol sTTIs and 3-symbol sTTIs.

DETAILED DESCRIPTION

Figure 4:
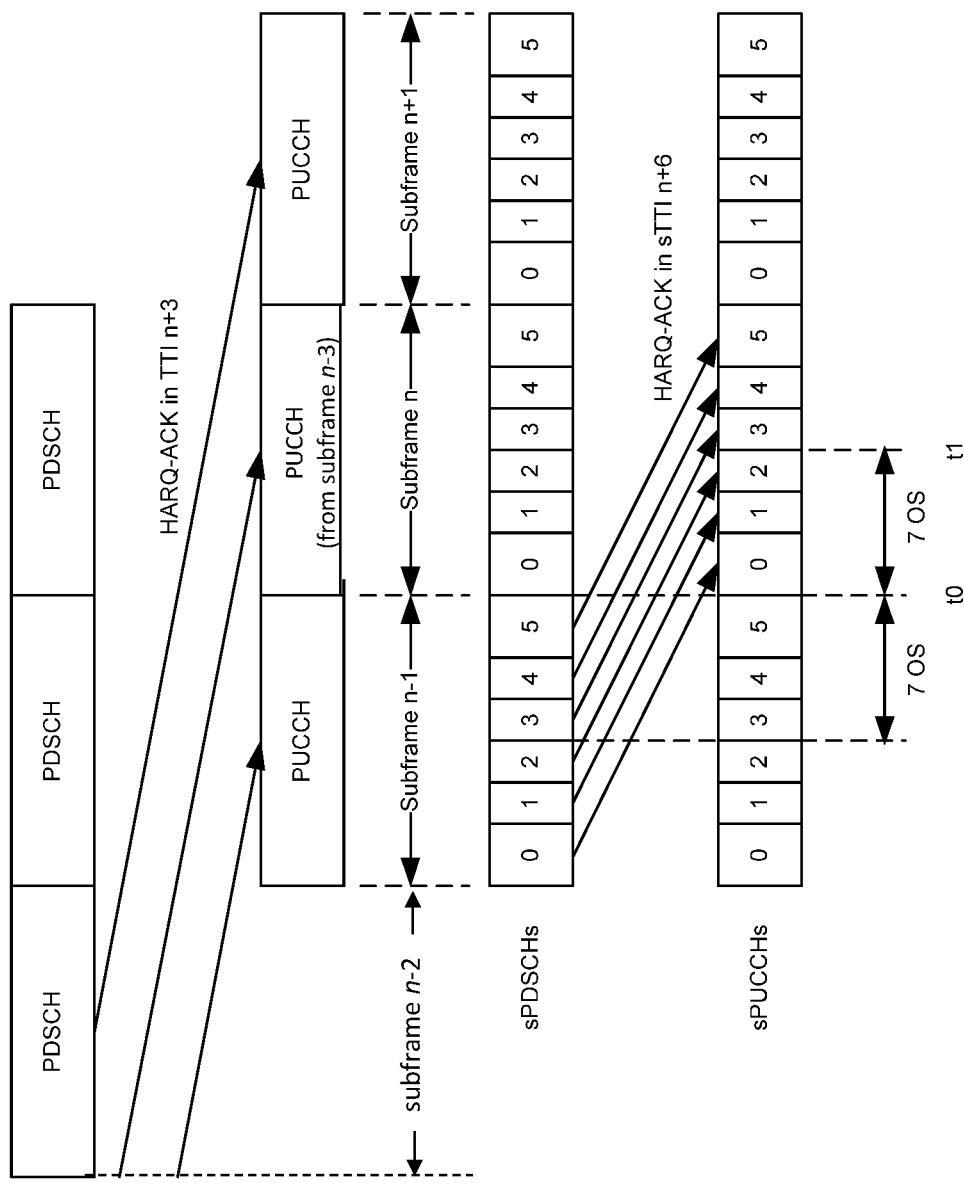
FIG. 4 is a signalling timing diagram showing timing of PDSCH and sPDSCH transmissions and the corresponding HARQ-ACK feedbacks according to an embodiment of these teachings.

FIG. 2 is a prior art schematic overview of an example radio environment in which embodiments of these teachings may be practiced to advantage. There is a serving eNB 20 having coverage area delineated by the dotted line that is in bidirectional wireless communication with a UE 10 via a radio link 12. The radio link 12 is active when the UE is in the RRC connected state and the examples below assume this RRC connected state for the UE. In some deployments the radio link 12 may be to a relay node or a remote radio head RRH which from the UE's perspective stand in the position of the eNB 20. The eNB terminology implies a LTE radio access technology in use on the radio link 20 but this is not limiting; for example in the 5G/New Radio technology being developed by the 3GPP organization the traditional base station/eNB is to be implemented as multiple RRHs that perform radio-frequency level signal processing (also known as layer 1) that are each located up to several km from a baseband unit (BBU, which may be implemented as multiple coupled BBUs for added processing power) that performs baseband signal processing (also known as layer 2) and the BBU is coupled to the RRHs via front-haul links. The UE is to be in communication with one RRH or multiple RRHs simultaneously and the RRH/BBU combination is considered a gNB even though the different components of a traditional base station are not geographically co-located. Embodiments of these teachings can be deployed in other types of radio access technologies, but LTE is used in the non-limiting examples below. With respect to the radio link 12, the eNB sends the PDSCH and the sPDSCH to the UE on the downlink and the UE feeds back its HARQ-ACK signalling on the uplink Detailed below are UL control signalling solutions for providing HARQ-ACK feedback in one subframe of a carrier for both sPDSCH(s) and PDSCH.

One possible solution to HARQ feedback for the different TTI lengths on the downlink is to transmit the HARQ-ACK feedback for the sPDSCH and for the PDSCH simultaneously on different physical resource blocks (PRBs) with different TTI lengths. But in fact this is not practical for a cellular type system because it would require complex power control rules when the total TX power and transmission bandwidth are changing in the middle of an ongoing transmission during a subframe. Even if the power of the ongoing transmission could be kept constant, experience suggests this solution would also have further adverse impact due to disruption caused by sudden increase in the total power and bandwidth. But even if this solution could be otherwise made practical it would necessarily sacrifice some of the key benefits of single carrier UL signals, specifically a low peak-to-average power ratio.

Another possible solution might be to joint encode the HARQ-ACK feedback for sPDSCH and for PDSCH in order to transmit the feedback with a 1 ms UL transmission. This also is not preferred because it would sacrifice some of the latency benefit of shortening the sTTI in the first place.

Embodiments of these teachings are consistent with transmitting the HARQ-ACK for sPDSCH with sTTI. More specifically, the examples below send the PDSCH HARQ-ACK feedback using a sTTI transmission when feedback needs to be provided for a sPDSCH and for a PDSCH in the same subframe.

The structure of the sTTI for LTE Rel. 15 is explored to better put the examples below in the context of a practical though non-limiting deployment. FIG. 3 illustrates two of the alternatives currently agreed in the 3GPP for the frame structure of a 2-symbol sTTI of the short Physical Uplink Shared Channel (sPUSCH) which carries the HARQ-ACK signalling. To avoid any of the sTTIs crossing the slot boundary, there are actually two 3-symbol sTTIs in a subframe (one 3-symbol sTTI per slot) and the total number of sTTIs in a subframe is six. The 3-2-2-2-2-3 configuration shown at FIG. 3 defines that number of OFDM symbols in those consecutive sTTIs of the 1 ms uplink subframe, and similar for the 2-2-3-2-2-3 configuration shown there. In the 3GPP it is also agreed that the short Physical Uplink Control Channel (sPUCCH) and the sPUSCH share the same sTTI length; it is a reasonable assumption then that the sTTI borders of sPUSCH and sPUCCH are aligned.

The below examples consider the interaction between the 1-ms legacy TTI and the 2-symbol sTTI, and in particular the multiplexing of HARQ-ACK feedback using different TTI lengths. First define a slot wise (on a per 0.5 ms basis) cancellation of PUCCH transmission in a situation where HARQ-ACKs for PDSCH and sPDSCH need to be sent in the same subframe. The slot wise cancellation would allow full utilization of PUCCH multiplexing capacity with orthogonal cover codes of PUCCH Formats 1a/1b and Format 3 (these formats are known in the radio arts and published in LTE radio standards). These examples use terms that are consistent with 3GPP cellular radio access technologies but such terminology is not a limitation to the broader teachings herein, for example some non-3GPP systems may not utilize the term TTI in which case the TTI length described in these examples can be considered more generally a transmission duration.

FIG. 4 illustrates the basic operation of an embodiment of these teachings, which assumes a reduced UE processing time (that is, the delay between the UE's reception of downlink data and the UE's transmission of the corresponding HARQ-ACK in the uplink) of n+3 TTIs for the HARQ-ACK of the (non-shortened) PDSCH it receives, and a processing time of n+6 sTTIs for the HARQ-ACK of the sPDSCH it receives.

The example signalling scenario at FIG. 4 is as follows. A UE has received a PDSCH in subframe n−3 and has to provide HARQ-ACK in the PUCCH at subframe n. It is assumed that one non-shortened TTI equals one subframe, so this is equivalent to saying the UE received the PDSCH in TTI n−3 and needs to provide the corresponding HARQ-ACK signalling in TTI n; FIG. 4 consistently illustrates spacing (processing delay) of 3 subframes (3 non-shortened TTIs) from the PDSCH to the corresponding PUCCH that carries the HARQ-ACK signalling.

Now consider the sTTIs. The UE is required to process the sPDSCH assignments in sTTIs 0-2 of subframe n−1 of FIG. 4 by the beginning of the subframe n and that beginning is shown at FIG. 4 by the time t0. Here we assume the assignment for a sPDSCH in a sTTI is sent in the same sTTI. That is, the UE is expected to search and decode the sPDSCH assignments and decide whether it will send HARQ-ACK (or not respond if there is no assignment for this UE in this sPDSCH) within from 7 to 11 OFDM symbols of the end of the sTTI that carries the sPDSCH and the corresponding assignment; the processing delay is shortest for the sTTI 2 and longest for the sTTI 0. The minimum processing delay is shown at FIG. 4 as the 7 OSs that occupy sTTIs 3-5 of subframe n−1 immediately prior to the time t0. Said another way, FIG. 4 assumes the UE is allowed at least processing delay of one slot (one half subframe or 0.5 ms) for decoding of a sPDSCH assignment. It should be noted that there is a longer 5 sTTI processing time allowed for decoding a sPDSCH and preparing transmission of the HARQ-ACK i.e. within the shorter, at least 7 symbol processing time, it should be found out if sPDSCH has been transmitted and then additional time is allowed for processing the sPDSCH. There are two possibilities: at least one of the sPDSCHs in TTIs 0-2 of subframe n−1 has an assignment for the UE or none of them do.

If the latter and there are no sPDSCH assignments for the sTTIs 0-2 of subframe n−1 of FIG. 4, the UE starts a PUCCH transmission for sending HARQ-ACK for the PDSCH received in subframe n−3. This is shown in FIG. 4 as the PUCCH in subframe n. If the former and the UE has received at least one sPDSCH grant in at least one of sTTIs 0-2 of subframe n−1, the UE does not start the PUCCH transmission (which would be the HARQ-ACK corresponding to the PDSCH the UE received in subframe n−3) but instead sends its PDSCH HARQ-ACK in one of the sPUCCHs in the subframe n.

There are two different ways to implement this multiplexing, where the UE sends its PDSCH HARQ-ACK in one of the sTTIs because it also has a HARQ-ACK to send in one or more sTTIs of that same subframe. In a first implementation the PDSCH HARQ-ACK is always sent in the sPUCCH with 3-symbol sTTI in the first slot of the feedback subframe (subframe n in this example). If we assume the 3-2-2-2-2-3 configuration shown at FIG. 3, this embodiment minimizes the latency because the 3-symbol sTTI is always the first sTTI in the subframe being used for HARQ-ACK feedback. For example, assume the UE at FIG. 4 receives a PDSCH in subframe n−3 and also a sPDSCH in sTTI 0 of subframe n−1. In this first implementation the HARQ-ACK for both would be sent in sTTI 0 of subframe n. This sTTI0 suits best for multiplexing both HARQ-ACK feedbacks in a single sTTI because there are 3 OFDM symbols in that uplink sTTI and therefore more resources for HARQ-ACK transmission.

In a second implementation, the PDSCH HARQ-ACK is sent in the sTTI of the first slot that is not used for sPDSCH HARQ-ACK, and only if there is no such vacant sTTI the PDSCH HARQ-ACK is multiplexed in a 3-symbol sTTI of the slot. For this second implementation consider two different examples. In a first the UE at FIG. 4 again receives a PDSCH in subframe n−3 and also a sPDSCH in sTTI 0 of subframe n−1, and also sPDSCHs in sTTI 1-2 of subframe n−1. In this example of the second implementation the HARQ-ACK for both the PDSCH in subframe n−3 and the sPDSCH in sTTI 0 of subframe n−1 would be multiplexed in sTTI 0 of subframe n, same as the example above for the first implementation. This multiplexing in the 3-symbol sTTI is necessary because the sTTIs 1-2 of subframe n are occupied with the HARQ-ACK feedback from the sPDSCHs the UE received in respective sTTIs 1-2 of subframe n−1, so there are no vacant sTTIs in the slot. In a second example for this second implementation assume the same as the first example except the UE gets no sPDSCH in sTTI 1 of subframe n−1. In this case the sTTI in subframe n of the sPUCCH is vacant, so the HARQ-ACK feedback for the PDSCH from subframe n−3 will go there and the HARQ-ACK multiplexing is within a slot but not within a sTTI.

In order that the UE and the network have a common understanding of the correct mapping and multiplexing scheme, either the first or second implementation can be specified in the governing radio standard, or alternatively the eNB could indicate via signalling which implementation the UE should use, or the use of one or the other implementations can depend on cell-specific conditions such as for example the carrier aggregation condition such as the payloads of sPDSCH and PDSCH HARQ-ACKs.

Now consider the second slot of sTTIs 3-5 at subframe n−1 of FIG. 4. If the UE transmitted PUCCH in the first slot of subframe n (that is, no sPDSCH HARQ-ACK was transmitted in the slot), the UE is required to process the sPDSCH assignments that it received in sTTIs 3-5 of subframe n−1 before the beginning of the second slot in the subframe n; that beginning is marked at time t1 in FIG. 4. There are also two possibilities for this slot also: at least one of the sPDSCHs in TTIs 3-5 of subframe n−1 (the second slot) has an assignment for the UE or none of them do.

In the latter case if UE does not detect any sPDSCH assignments that are to be acknowledged in the second slot of subframe n, the UE continues transmitting PUCCH in that second slot.

In the former case if UE does receive at least one sPDSCH assignment in sTTIs 3-5 of subframe n, the UE does not continue its PUCCH transmission in the second slot. In this situation the UE transmits its PDSCH HARQ-ACK in the 3-symbol sTTI always (the first implementation explained above) or unless one of the earlier sTTIs is not needed for sPDSCH HARQ-ACK but is vacant for PDSCH HARQ-ACK (the second implementation detailed above). In some specific embodiments and depending on the PUCCH format, it might also be possible not to transmit PDSCH HARQ-ACK at all in the second slot of subframe n but to rely on the first half of the PUCCH already transmitted in the first slot of subframe n. This eventuality should be taken into account when the UE sets its transmit power on the PUCCH, and among the conventional PUCCH formats for LTE this could be feasible only with PUCCH Formats 1a and 1b.

In another implementation, referring again to FIG. 4, if UE becomes aware of the need to transmit an sPDSCH HARQ-ACK in the first slot of subframe n, UE cancels PUCCH transmission in the slot and postpones PDSCH HARQ-ACK sending to the second slot. In the second slot, if no sPDSCH HARQ ACK needs to be transmitted in the slot, PDSCH HARQ-ACK could be sent as a second slot of the PUCCH (whose first slot was cancelled) or in one of the sTTIs, multiplexed with sPDSCH HARQ-ACK or alone.

FIG. 4 illustrates the sPUCCHs with the 3-2-2-2-2-3 configuration shown at FIG. 3. For the other 2-2-3-2-2-3 configuration of sTTIs shown at FIG. 3, there is another implementation that is suitable where there are less stringent processing constraint for sPDSCH assignments than assumed for the above examples (where UE is required to process the sPDSCH assignments in sTTIs 2 of subframe n−1 of FIG. 4 by the beginning of the subframe n), and also when the PUCCH format in use is such that multiplexing of resources between UEs is not affected if the PUCCH is not transmitted over a full slot (or equivalently if less than the full multiplexing capacity is utilized). In this further third implementation the UE would cancel or stop its PUCCH transmission as soon as it becomes aware of the need to provide sPDSCH HARQ-ACK in a subframe, and instead the UE will transmit its PDSCH HARQ-ACK in the 3-symbol sTTI in the first slot, which is the third sTTI of the subframe for this 2-2-3-2-2-3 configuration if in fact the UE first becomes aware of the sPDSCH assignments before the last sTTI of the first slot. If the UE becomes aware of the sPDSCH assignments only after the last sTTI of the first slot, i.e. no sPDSCH needed to be acknowledged in the first slot it will transmit its PDSCH HARQ-ACK in the 3-symbol sTTI in the second slot. Another alternative is that if UE becomes aware of the need to acknowledge an sPDSCH in the subframe only after the last sTTI of the first slot, UE just ends PUCCH transmission without multiplexing PDSCH HARQ-ACK to any sTTI of the second slot. This would mean relying on the first half of the PUCCH already transmitted in the first slot of the subframe.

Figure 5:
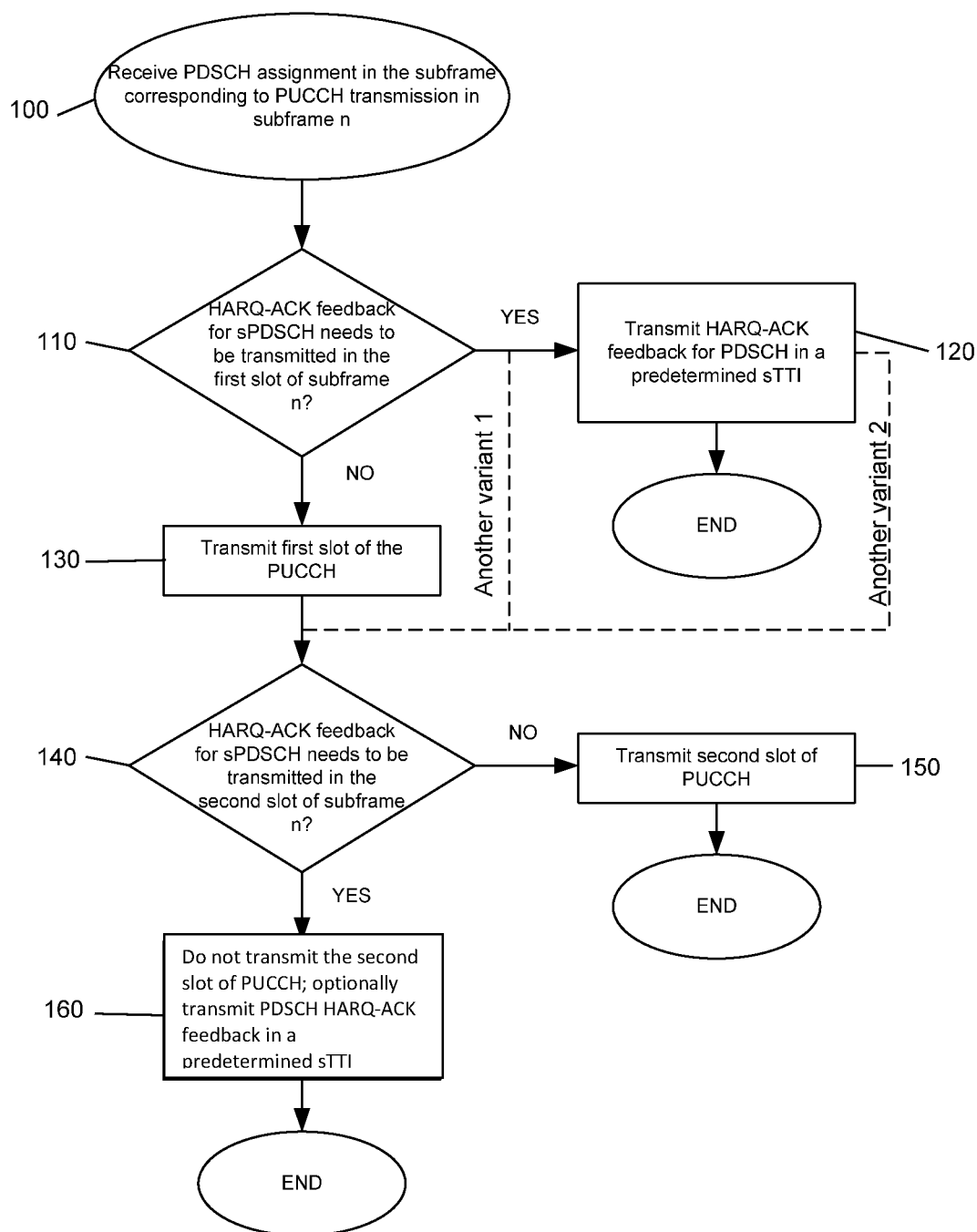
FIG. 5 is a logic flow diagram from the perspective of the UE describing a procedure for PDSCH HARQ-ACK transmission according to an embodiment of these teachings.

FIG. 5 is a flow chart summarizing the above aspects a bit more concisely from the perspective of the UE. Note that the network's radio access node/eNB will need to do the same mapping as the UE in order for the network to know which PDSCH or sPDSCH is being acknowledged by any of the various HARQ-ACKs it receives in the sTTIs of any given sPUCCH, so the algorithm from the network's perspective is similar to that shown at FIG. 5 although reversed a bit since the network sends the DL signalling and receives the UL signalling being mapped in time.

At block 100 the UE receives a PDSCH assignment in the subframe corresponding to the UE's PUCCH transmission in subframe n. The UE has not made this PUCCH transmission yet, but knows immediately upon receiving the PDSCH that the corresponding HARQ-ACK needs to be sent in subframe n. In the examples above the non-shortened processing time was 3 subframes so in that case block 100 means the UE received the PDSCH assignment in subframe n−3, as is shown at FIG. 4.

Next at block 110 the algorithm implementing an embodiment of these teachings and running in the UE queries at block 110 whether HARQ-ACK feedback for some sPDSCH needs to be transmitted in the first slot of that same subframe n. If yes then block 120 become operational and the UE transmits its HARQ-ACK feedback for the PDSCH received at block 100 in a predetermined sTTI, and the above examples give different embodiments which specific sTTI that will be. Since block 110 found that HARQ-ACK feedback needs to be transmitted in the first slot of subframe n, that will also be transmitted in the same first slot and the specific sTTIs are detailed in the examples above. In any case, block 120 means the HARQ-ACK for the PDSCH and for one or more sPDSCHs are going to be multiplexed in a same slot of subframe n. This embodiment terminates at this point with the END block following block 120. If the answer to the query at block 110 is no then block 130 shows the UE transmits its PUCCH from block 100 for the PDSCH received at block 100 in the first slot of subframe n. After this, in block 140, need for sPDSCH HARQ-ACK transmission in the second slot is checked. The answer NO means that UE is allowed to transmit also the second slot of PUCCH in block 150. If the answer is YES, in block 160, UE must not transmit the second slot of PUCCH but instead, optionally, transmit PDSCH HARQ-ACK in a predetermined sTTI of the second slot.

In variant 1 shown at FIG. 5, if the decision at block 110 is yes then this leads to a further query at block 140 whether the HARQ-ACK feedback for some sPDSCH needs to be transmitted in the second slot of subframe n. If no then the PUCCH from block 100 corresponding to the PDSCH received at block 100 is transmitted in the second slot of subframe n as block 150 summarizes. If yes then block 160 becomes operative in which case the second slot of the PUCCH of block 100 is not transmitted. If PUCCH of the first slot was transmitted corresponding to block 130, UE may optionally transmit PDSCH HARQ ACK in a predetermined sTTI of the second slot. If the procedure had progressed to block 160 skipping block 130, UE needs to transmit PDSCH HARQ-ACK in a predetermined sTTI as otherwise PDSCH HARQ-ACK would not be transmitted at all.

In variant 2 of FIG. 5 the query at block 140 only becomes active after the predetermined sTTI for the HARQ-ACK feedback corresponding to the PDSCH received at block 100 has been identified at block 120, but otherwise this variant 2 is the same as variant 1 except that in block 160 transmission of PDSCH HARQ-ACK is optional irrespective of whether the procedure went through block 130.

For the above specific examples some of the rules for the sPUCCH resource allocation for the multiplexed HARQ-ACK are:

1) If the UE has been scheduled with a sPDSCH, which will be acknowledged in the same 3-symbol sTTI as the 1-ms PDSCH, the UE shall use for example a) A part of the PUCCH resource, such as the same cyclic shift, that would be used for transmission of the HARQ-ACK for the 1-ms PDSCH b) The resource implicitly or explicitly signalled for the sPUCCH.

i) Implicit signalling may include for example deriving the sPUCCH resource index based on the index of the lowest sPDCCH control channel element scheduling the sPDSCH transmission.

ii) Explicit signalling may include for example ARI (ACK/NACK resource indicator) in the sPDCCH, or RRC (Radio Resource Control) signaling.

2) If the UE has not been scheduled with an sPDSCH which will be acknowledged in the same 3-symbol sTTI as the 1-ms PDSCH, the UE shall use for example:

a) A predetermined sPUCCH resource (such as one of the resources associated with ARI) or an RRC configured resource.

b) A part of the PUCCH resource (for example, the same cyclic shift but only 3 symbols).

The 6 sTTI UE processing time (n+6) for sPDSCH HARQ-ACK is assumed for purposes of more thoroughly explaining the invention but is not a limiting factor of the broader teachings herein. For example, if instead the sPDSCH HARQ-ACK processing time is 4 sTTIs, (n+4), the 7 symbol decoding time in the above n+6 examples from the end of sPDSCH assignment to the possible start of PUCCH transmission shrinks to 2 symbols. Other processing delays of course follow from these examples and are within the broader aspects of these teachings.

One technical effect of these teachings is that they allow for efficient multiplexing of HARQ-ACKs for PDSCH and sPDSCH in a same subframe. This helps in avoiding scheduling restrictions with respect to what PDSCH (and TTI) lengths are applied in the downlink. This becomes beneficial especially when switching between 1-ms TTI and sTTI on a carrier, or when applying different TTI lengths on different carriers in carrier aggregation. Another technical effect is that the slot wise cancellation would allow full utilization of the PUCCH multiplexing capacity with orthogonal cover codes of conventional PUCCH Formats 1a/1b and Format 3; that is, cancelling the transmission does not compromise the orthogonality of PUCCH channels located on the same physical resource block.

Figure 6:
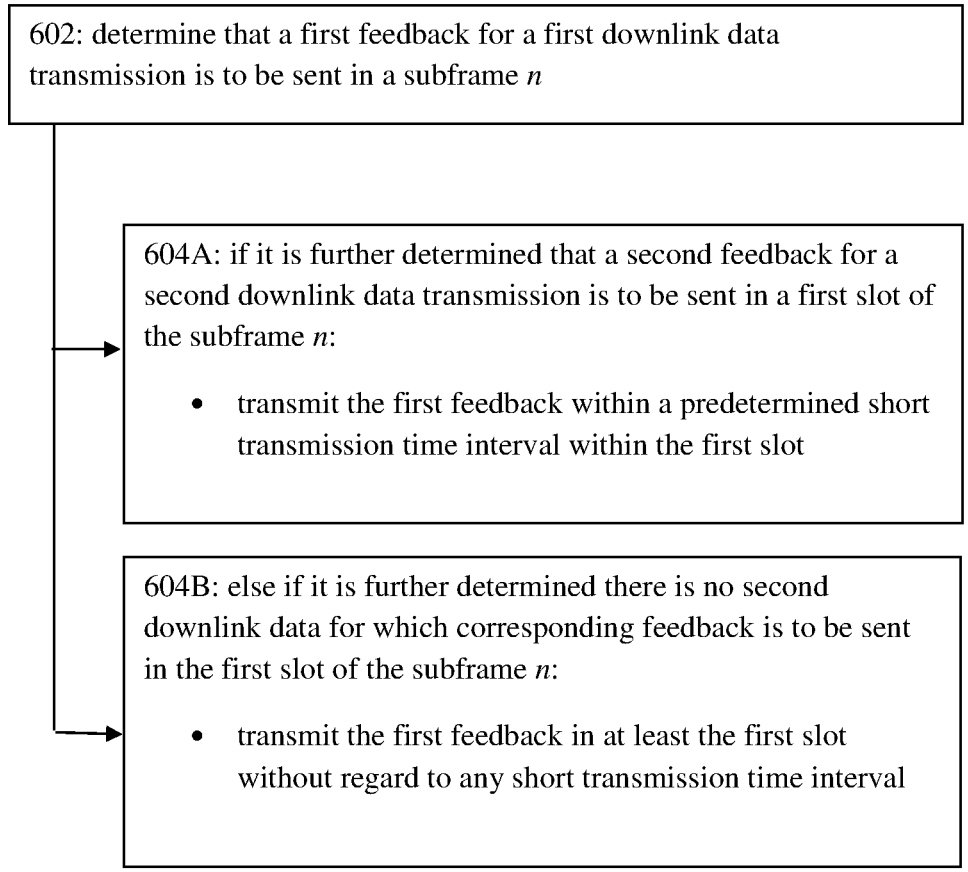
FIG. 6 is a process flow diagram summarizing certain of the above teachings from the perspective of the UE that transmits the HARQ-ACK feedback.

FIG. 6 is a process flow diagram that summarizes some of the above aspects in terms that read on actions at the UE, but these are similarly done at the eNB/radio access node in the mirror image such that the feedback transmitted by the UE in FIG. 6 is the same feedback that is received by the eNB and by doing the same mapping of PDSCH/sPDSCH to the feedback PUCCH subframe n the network will know which PDSCH/sPDSCH is being ACK'd. In this regard at FIG. 6 subframe n is any generic subframe; the identifier n is simply to indicate it is the same subframe.

FIG. 6 describes from the perspective of handling the HARQ-ACK feedback for the 1 ms PDSCH in that it is handled/mapped differently depending on whether or not there is also HARQ-ACK feedback for the sPDSCH to be sent in the same subframe n of the PUCCH. At block 602 the UE determines that a first feedback (the PDSCH HARQ-ACK in the above examples) for a first downlink data transmission (the PDSCH in the above examples) is to be sent in a subframe n. Block 604A deals with the option that there is also a second feedback (the sPDSCH HARQ-ACK in the above examples) for a second downlink data transmission (the sPDSCH in the above examples) to be sent in a first slot of the subframe n; in this case the UE transmits the first feedback within a predetermined sTTI within the first slot. Block 604B deals with the opposite case, there is no second downlink data for which corresponding feedback is to be sent in the first slot of the subframe n; in this case the UE transmits the first feedback in at least the first slot. So long as the 1-ms PUCCH transmission that was interrupted after the first slot in the above examples is not considered as a 7-symbol sTTI, the first feedback transmitted at block 604B is without regard to any short transmission time interval. As detailed above, in this case the UE will transmit the PDSCH HARQ-ACK in the first slot of subframe n and depending on whether there is a sPDSCH HARQ-ACK to transmit in a second slot of that same subframe n the UE will either stop transmitting the PDSCH HARQ-ACK before the second slot begins or will continue transmitting it into the second slot.

In the context of FIG. 6, consider now the second feedback. If block 604A is operative for a given signalling event and this second feedback is to be sent in the first slot of the subframe n, then FIG. 6 would be extended such that the UE transmits the second feedback in a sTTI within the first slot that corresponds, after a predetermined delay which in the examples above is one subframe, to a same sTTI in which the second downlink data transmission was received. FIG. 4 shows this via the diagonal lines from the sPDSCH to the sPUCCH in that the HARQ-ACK for a sPDSCH received in any of sTTI 0-2 (first slot) of subframe n−1 is sent in the same sTTI of subframe n (though in different logical channels of course).

If instead block 604B of FIG. 6 is operative in a given signalling event and there is second feedback for a second downlink data transmission that is to be sent in a second slot of the subframe n (e.g., but not in the first slot), then the UE limits its transmission of the first feedback to only the first slot and further it transmits the second feedback within a predetermined sTTI within the second slot. Like the sTTIs of the first slot, in the examples above the predetermined nature is such that the second feedback is sent in a sTTI within the second slot that corresponds to a same sTTI in which the second downlink data transmission was received, and as above that correspondence is after a predetermined delay which in the above examples is one subframe/14 symbols. FIG. 4 shows this again via the diagonal lines from the sPDSCH to the sPUCCH in that the HARQ-ACK for a sPDSCH received in any of sTTI 3-5 (second slot) of subframe n−1 is sent in the same sTTI of subframe n, and again in different logical channels.

Consider again a signalling event in which block 604B is operative (the first feedback is transmitted in the first slot); if the UE further determines there is no second downlink data for which corresponding feedback is to be sent in the second slot of that subframe n, then the UE need not stop transmitting the HARQ-ACK feedback for the 1 ms PDSCH at the end of the first slot but can transmit that first feedback in the first slot and in the second slot of subframe n.

Several different implementations are detailed above for what is the predetermined sTTI recited at block 604A. In one embodiment it was the 3-symbol sTTI, but that was among sTTIs of length 2-symbols and 3-symbols so this is stated more generally as the longest one of all the sTTIs within the first slot. In a different embodiment it depended on whether or not there was a vacant sTTI: namely it was a first-in-time sTTI within the first slot that is vacant after transmitting the second feedback; and if there is no sTTI within the first slot that is vacant then the predetermined sTTI is the longest one of all the sTTIs within the first slot only. In this latter case the UE multiplexes the first feedback and the second feedback for transmission within that longest one of all the sTTIs within the first slot.

In the above examples the UE that performs the algorithm shown at FIG. 6 and further detailed above is operating in a LTE radio access technology network; the first downlink data transmission is received in a PDSCH with a 1 ms TTI; the second downlink data transmission is received in a sPDSCH with a sTTI defining 2 or 3 symbols that span less than 1 ms; and the first feedback and the second feedback are each HARQ-ACK feedback.

Various of these aspects summarized in the above paragraphs describing specifics for the blocks of FIG. 6 may be practiced individually or in any of various combinations. Any or all of these aspects of the invention with respect to FIG. 6 can be embodied as a computer readable memory tangibly storing a computer program that when executed causes a UE to perform the actions described above for FIG. 6. Similarly an algorithm similar but reciting from the perspective of the radio access node/eNB can be embodied as a computer readable memory tangibly storing a computer program that when executed causes a host radio access node to perform the similar actions from the network's perspective.

These teachings can further be embodied as an apparatus, such as a UE or a network access node/base station or components thereof, comprising at least one processor and at least one memory storing a computer program. In this embodiment the at least one processor is configured with the at least one memory and the computer program to cause the apparatus to perform the actions described above for FIG. 6, and similar such actions and mapping for the radio access node/eNB.

Figure 7:
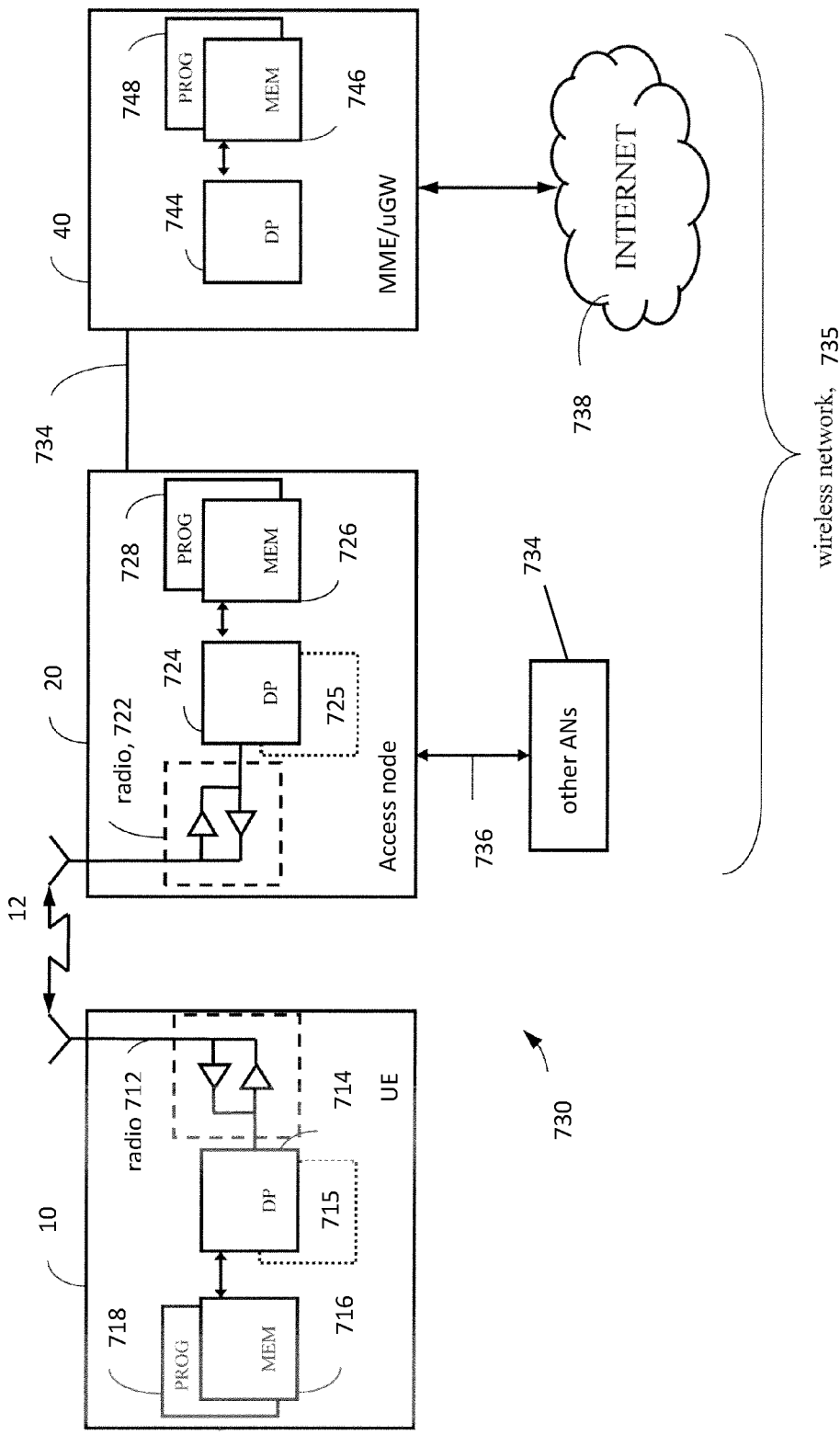
FIG. 7 is a high level schematic block diagram illustrating certain apparatus/devices that are suitable for practicing certain of these teachings.

FIG. 7 is a high level diagram illustrating some relevant components of various communication entities that may implement various portions of these teachings, including a base station identified generally as a radio network access node 20, a mobility management entity (MME) which may also be co-located with a user-plane gateway (uGW) 40, and a user equipment (UE) 10. In the wireless system 730 of FIG. 7 a communications network 735 is adapted for communication over a wireless link 12 with an apparatus, such as a mobile communication device which may be referred to as a UE 10, via a radio network access node 20. As noted above for an example gNB the radio access node may have distributed hardware (BBU and RRHs). The network 735 may include a MME/Serving-GW 40 that provides connectivity with other and/or broader networks such as a publicly switched telephone network and/or a data communications network (e.g., the internet 738).

The UE 10 includes a controller, such as a computer or a data processor (DP) 714 (or multiple ones of them), a computer-readable memory medium embodied as a memory (MEM) 716 (or more generally a non-transitory program storage device) that stores a program of computer instructions (PROG) 718, and a suitable wireless interface, such as radio frequency (RF) transceiver or more generically a radio 712, for bidirectional wireless communications with the radio network access node 20 via one or more antennas. In general terms the UE 10 can be considered a machine that reads the MEM/non-transitory program storage device and that executes the computer program code or executable program of instructions stored thereon. While each entity of FIG. 7 is shown as having one MEM, in practice each may have multiple discrete memory devices and the relevant algorithm(s) and executable instructions/program code may be stored on one or across several such memories.

In general, the various embodiments of the UE 10 can include, but are not limited to, mobile user equipments or devices, cellular telephones, smartphones, wireless terminals and autonomous IoT devices, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The radio network access node 20 also includes a controller, such as a computer or a data processor (DP) 724 (or multiple ones of them), a computer-readable memory medium embodied as a memory (MEM) 726 that stores a program of computer instructions (PROG) 728, and a suitable wireless interface, such as a RF transceiver or radio 722, for communication with the UE 10 via one or more antennas. The radio network access node 20 is coupled via a data/control path 734 to the MME 40. The path 734 may be implemented as an S1 interface. The radio network access node 20 may also be coupled to other radio network access nodes via data/control path 736, which may be implemented as an X5 interface.

The MME 40 includes a controller, such as a computer or a data processor (DP) 744 (or multiple ones of them), a computer-readable memory medium embodied as a memory (MEM) 746 that stores a program of computer instructions (PROG) 748.

At least one of the PROGs 718, 728 is assumed to include program instructions that, when executed by the associated one or more DPs, enable the device to operate in accordance with exemplary embodiments of this invention. That is, various exemplary embodiments of this invention may be implemented at least in part by computer software executable by the DP 714 of the UE 10; and/or by the DP 724 of the radio network access node 20; and/or by hardware, or by a combination of software and hardware (and firmware).

For the purposes of describing various exemplary embodiments in accordance with this invention the UE 10 and the radio network access node 20 may also include dedicated processors 715 and 725 respectively.

The computer readable MEMs 716, 726 and 746 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 714, 724 and 744 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 712 and 722) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Figure 8:
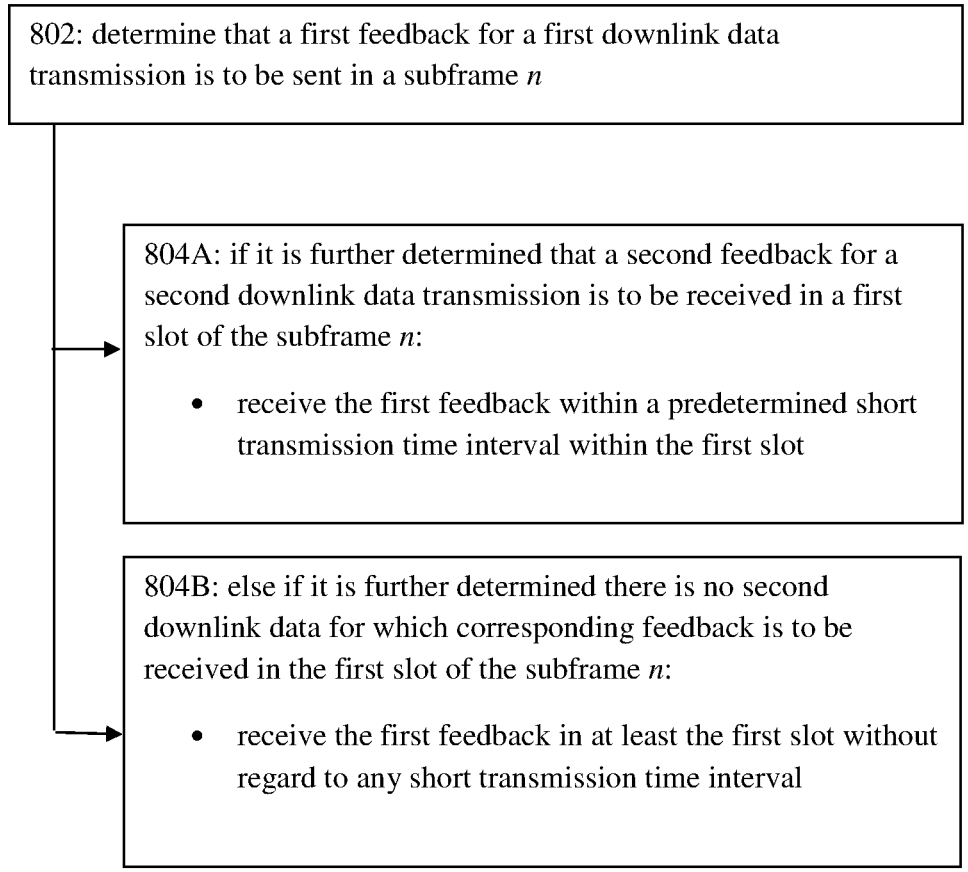
FIG. 8 is a process flow diagram summarizing certain of the above teachings from the perspective of the base station that receives the HARQ-ACK feedback.

FIG. 8 is a process flow diagram that summarizes some of the above aspects in terms that read on actions at the base station (e.g., or other network element). As described above, the actions from FIG. 6 are similarly done at the eNB/radio access node in the mirror image such that the feedback transmitted by the UE in FIG. 6 is the same feedback that is received by the eNB and by doing the same mapping of PDSCH/sPDSCH to the feedback PUCCH subframe n, the network will know which PDSCH/sPDSCH is being ACK'd. In this regard at FIG. 6 and FIG. 8 subframe n is any generic subframe; the identifier n is simply to indicate it is the same subframe.

FIG. 8 describes from the perspective of handling the HARQ-ACK feedback for the 1 ms PDSCH in that it is handled/mapped differently depending on whether or not there is also HARQ-ACK feedback for the sPDSCH to be sent in the same subframe n of the PUCCH. At block 802 the eNB (or other base station) determines that a first feedback (the PDSCH HARQ-ACK in the above examples) for a first downlink data transmission (the PDSCH in the above examples) is to be transmitted by the UE and received by the eNB in a subframe n. Block 804A deals with the option that there is also a second feedback (the sPDSCH HARQ-ACK in the above examples) for a second downlink data transmission (the sPDSCH in the above examples) to be received by the eNB in a first slot of the subframe n; in this case the UE transmits and the eNB receives the first feedback within a predetermined sTTI within the first slot. Block 804B deals with the opposite case, there is no second downlink data for which corresponding feedback is to be received in the first slot of the subframe n; in this case the UE transmits and the eNB receives the first feedback in at least the first slot. So long as the 1-ms PUCCH transmission that was interrupted after the first slot in the above examples is not considered as a 7-symbol sTTI, the first feedback received at block 804B is without regard to any short transmission time interval. As detailed above, in this case the UE will transmit and the eNB will receive the PDSCH HARQ-ACK in the first slot of subframe n and depending on whether there is a sPDSCH HARQ-ACK to transmit by the UE and receive by the base station in the second slot of that same subframe n, the UE will either stop transmitting (and the eNB will stop receiving) the PDSCH HARQ-ACK before the second slot begins or will continue transmitting (and the eNB will continue receiving) it into the second slot.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

The following abbreviations that may be found in the specification and/or the drawing figures are defined as follows:

3GPP Third Generation Partnership Project
A/N acknowledgement/negative acknowledgement (also ACK/NACK)
ARI ACK/NACK resource indicator
DL downlink
eNB enhanced NodeB (base station of an LTE system)
E-UTRAN evolved UMTS radio access network (also known as LTE)
FDD frequency division duplexing
HARQ hybrid automatic retransmission request
LTE Long Term Evolution
OFDM orthogonal frequency division multiplexing
OS OFDM symbol
PDCCH physical downlink control channel
PDSCH physical downlink shared channel
PRB physical resource block
PUCCH physical uplink control channel
PUSCH physical uplink shared channel
RAN radio access network
Rel release
RRC radio resource control
sPDCCH short PDCCH
sPDSCH short PDSCH
sPUCCH short PUCCH
sPUSCH short PUSCH
sTTI short transmission time interval
TSG technical specification group
TTI transmission time interval
UE user equipment
UL uplink
UMTS universal mobile telecommunications service

What is claimed is:

1. An apparatus comprising:
at least one processor and
at least one memory including computer program code;
the at least one memory and the computer program code can be configured to, with the at least one processor, cause the apparatus at least to
determine that a first feedback for a first downlink data transmission is to be sent in a subframe;
determine whether a second feedback for a second downlink data transmission is to be sent in a first slot of the subframe, wherein the second downlink data transmission was received in a short transmission time interval, having a certain one of a plurality of indexes, of an other subframe, wherein the subframe is next to the other subframe, and
in response to it being determined that the second feedback for the second downlink data transmission is to be sent in the first slot of the subframe, transmit the first feedback within a predetermined short transmission time interval within the first slot of the subframe, and transmit the second feedback in a short transmission time interval within the first slot that corresponds to a short transmission time interval having the certain index of the other subframe.

2. The apparatus according to claim 1 wherein: the short transmission time interval within the first slot is the predetermined short transmission time interval within the first slot; and the first feedback and the second feedback are multiplexed and transmitted in the short transmission time interval within the first slot.

3. The apparatus according to claim 1, wherein at least one of: the first feedback and the second feedback are transmitted with a same cyclic shift as would be used when the first feedback is transmitted without the second feedback; or the first feedback and the second feedback are transmitted in a resource that is predetermined according to explicit signaling or according to implicit signaling in a resource allocation that scheduled the second downlink data transmission.

4. The apparatus according to claim 1, wherein the first feedback and the second feedback: are not multiplexed together within the predetermined short transmission time interval within the first slot; and are transmitted within the first slot with a same cyclic shift as would be used when the first feedback is transmitted without the second feedback.

5. The apparatus according to claim 1, wherein the at least one memory and the computer program code are configured to, with the at least one processor, cause the apparatus at least to, in conjunction with transmitting the first feedback in the first slot: in response to it being further determined that the second feedback for the second downlink data transmission is to be sent in a second slot of the subframe, limit the transmitting of the first feedback to only the first slot and further transmit the second feedback within a predetermined short transmission time interval within the second slot.

6. The apparatus according to claim 5, wherein the at least one memory and the computer program code are configured to, with the at least one processor, cause the apparatus at least to: transmit the second feedback in a short transmission time interval within the second slot that corresponds, after a predetermined delay, to a same short transmission time interval in which the second downlink data transmission was received.

7. The apparatus according to claim 1, wherein the at least one memory and the computer program code are configured to, with the at least one processor, cause the apparatus at least to, in conjunction with transmitting the first feedback in the first slot: in response to it being further determined that the second feedback for the second downlink data transmission is to be sent in a second slot of the subframe, transmit the first feedback within a predetermined short transmission time interval within the second slot.

8. The apparatus according to claim 1, wherein the at least one memory and the computer program code are configured to, with the at least one processor, cause the apparatus at least to, in conjunction with transmitting the first feedback in the first slot: in response to it being further determined there is no second downlink data for which corresponding feedback is to be sent in the second slot of the subframe, transmit the first feedback in the first slot and in the second slot.

9. The apparatus according to claim 1, wherein the predetermined short transmission time interval within the first slot is a longest one of all the short transmission time intervals within the first slot.

10. The apparatus according to claim 1, wherein:
the predetermined short transmission time interval within the first slot is a first-in-time short transmission time interval within the first slot that is vacant after transmitting the second feedback; or
if there is no short transmission time interval within the first slot that is vacant, the predetermined short transmission time interval within the first slot is in a longest one of all the short transmission time intervals within the first slot, and the first feedback and the second feedback are multiplexed for transmission within the longest one of all the short transmission time intervals within the first slot.

11. The apparatus according to claim 1, comprising a user equipment operating in a long term evolution radio access technology network, wherein the first downlink data transmission is received in a physical downlink shared channel with a 1 ms transmission time interval; the second downlink data transmission is received in a short physical downlink shared channel with a short transmission time interval defining 2 or 3 symbols that span less than 1 ms; and the first feedback and the second feedback are each hybrid automatic retransmission request-acknowledgement feedback.

12. A method comprising:
  determining that a first feedback for a first downlink data transmission is to be sent in a subframe;
  determining whether a second feedback for a second downlink data transmission is to be sent in a first slot of the subframe, wherein the second downlink data transmission was received in a short transmission time interval, having a certain one of a plurality of indexes, of an other subframe, wherein the subframe is next to the other subframe, and
  in response to it being determined that the second feedback for the second downlink data transmission is to be sent in the first slot of the subframe, transmitting the first feedback within a predetermined short transmission time interval within the first slot of the subframe, and transmitting the second feedback in a short transmission time interval within the first slot that corresponds to a short transmission time interval having the certain index of the other subframe.

13. The method according to claim 12, wherein: the short transmission time interval within the first slot is the predetermined short transmission time interval within the first slot; and the first feedback and the second feedback are multiplexed and transmitted in the short transmission time interval within the first slot.

14. The method according to claim 12, wherein at least one of: the first feedback and the second feedback are transmitted with a same cyclic shift as would be used when the first feedback is transmitted without the second feedback; or the first feedback and the second feedback are transmitted in a resource that is predetermined according to explicit signaling or according to implicit signaling in a resource allocation that scheduled the second downlink data transmission.

15. The method according to claim 12, wherein the first feedback and the second feedback: are not multiplexed together within the predetermined short transmission time interval within the first slot; and are transmitted within the first slot with a same cyclic shift as would be used when the first feedback is transmitted without the second feedback.

16. The method according to claim 12, further comprising, in conjunction with transmitting the first feedback in the first slot: in response to it being further determined that the second feedback for the second downlink data transmission is to be sent in a second slot of the subframe, limiting the transmitting of the first feedback to only the first slot and further transmitting the second feedback within a predetermined short transmission time interval within the second slot.

17. The method according to claim 12, further comprising, in conjunction with transmitting the first feedback in the first slot: in response to it being further determined that the second feedback for the second downlink data transmission is to be sent in a second slot of the subframe, transmitting the first feedback within a predetermined short transmission time interval within the second slot.

18. The method according to claim 12, wherein the predetermined short transmission time interval within the first slot is a longest one of all the short transmission time intervals within the first slot.

19. An apparatus comprising:
  at least one processor and at least one memory including computer program code;
  the at least one memory and the computer program code can be configured to, with the at least one processor, cause the apparatus at least to
  determine that a first feedback for a first downlink data transmission is to be received in a subframe;
  determine whether a second feedback for a second downlink data transmission is to be received in a first slot of the subframe, wherein the second downlink data transmission was transmitted in a short transmission time interval, having a certain one of a plurality of indexes, of an other subframe, wherein the subframe is next to the other subframe, and
  in response to it being determined that the second feedback for the second downlink data transmission is to be received in the first slot of the subframe, receive the first feedback within a predetermined short transmission time interval within the first slot of the subframe, and receive the second feedback in a short transmission time interval within the first slot that corresponds to a short transmission time interval having the certain index of the other subframe.

20. The apparatus according to claim 19, wherein the at least one memory and the computer program code are configured to, with the at least one processor, cause the apparatus at least to, in conjunction with receiving the first feedback in the first slot: in response to it being further determined that a second feedback for a second downlink data transmission is to be received in a second slot of the subframe, limit the receiving of the first feedback to only the first slot and further receive the second feedback within a predetermined short transmission time interval within the second slot.

* * * * *